(12) United States Patent
Gong (10) Patent No.: US 11,340,729 B2
(45) Date of Patent: May 24, 2022

(54) TOUCH SUBSTRATE AND DISPLAY PANEL

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventor: Qing Gong, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/238,360

(22) Filed: Apr. 23, 2021

(65) Prior Publication Data
US 2021/0333971 A1    Oct. 28, 2021

(30) Foreign Application Priority Data
Apr. 24, 2020    (CN) .......................... 202010332709.7

(51) Int. Cl.
*G06F 3/041*    (2006.01)
*G06F 3/044*    (2006.01)

(52) U.S. Cl.
CPC ........ *G06F 3/04164* (2019.05); *G06F 3/0446* (2019.05); *G06F 3/0448* (2019.05)

(58) Field of Classification Search
CPC ... G06F 3/04164; G06F 3/0446; G06F 3/0448
USPC ......................................................... 345/156
See application file for complete search history.

(56) References Cited

U.S. PATENT DOCUMENTS

| 2015/0097801 | A1* | 4/2015 | Trend | H05K 3/16 345/174 |
|---|---|---|---|---|
| 2017/0147114 | A1* | 5/2017 | Dong | G06F 3/0446 |
| 2019/0087027 | A1* | 3/2019 | Shim | G06F 3/044 |
| 2021/0181896 | A1* | 6/2021 | Deng | G06F 3/0412 |

* cited by examiner

*Primary Examiner* — Mark Edwards
(74) *Attorney, Agent, or Firm* — Houtteman Law LLC (57) ABSTRACT

Provided are a touch substrate and a display panel. The touch substrate includes a base; multiple touch units provided on the base, each touch unit includes a driving electrode and a sensing electrode, the driving electrode includes a first main body portion and multiple first limb portions positioned on an edge of the first main body portion, the first limb portions are connected to the first main body portion; the sensing electrode includes a second main body portion and multiple second limb portions positioned on an edge of the second main body portion, the second limb portions are connected with the second main body portion; orthographic projections of the first and second limb portions on the base are alternately engaged with each other, at least parts of profiles of opposite edges of the first limb portions and the second limb portions are arcuate and substantially consistent with each other.

18 Claims, 5 Drawing Sheets

TOUCH SUBSTRATE AND DISPLAY PANEL

CROSS REFERENCE TO RELATED APPLICATIONS

This application claims priority to Chinese patent application No. 202010332709.7, filed at the Chinese Intellectual Property Office on Apr. 24, 2020, the disclosure of which is incorporated herein by reference in its entirety.

TECHNICAL FIELD

The present disclosure relates to the field of display technology, and particularly relates to a touch substrate and a display panel.

BACKGROUND

In the field of touch display technology, a touch screen is attached to a display screen in many ways, for example, to form an On Cell touch screen and an In Cell touch screen, where the On Cell touch screen is favored because of its advantages of high touch accuracy and being convenient to be manufactured.

The On Cell touch technology is mainly classified into self-capacitance touch and mutual capacitance touch at present. The mutual capacitance touch has higher touch accuracy than the self-capacitance touch, and can support a real multi-point touch.

SUMMARY

An embodiment of the present disclosure provides a touch substrate, including: a base; and a plurality of touch units provided on the base, where each touch unit includes a driving electrode and a sensing electrode, and the driving electrode includes a first main body portion and a plurality of first limb portions, the first limb portions are positioned on an edge of the first main body portion, and the first limb portions are connected to the first main body portion; the sensing electrode includes a second main body portion and a plurality of second limb portions, the second limb portions are positioned on an edge of the second main body portion, and the second limb portions are connected with the second main body portion; and orthographic projections of the first limb portions on the base and orthographic projections of the second limb portions on the base are alternately engaged with each other, and at least parts of profiles of opposite edges of the first limb portions and the second limb portions, which are engaged with each other, are arcuate and substantially consistent with each other.

In some implementations, the touch unit includes two driving electrodes and two sensing electrodes, and the touch unit further includes a bridge portion, the bridge portion includes a first electrode and third connecting bridges, the first limb portions, which are closest to a center of the touch unit, of the two driving electrodes or the second limb portions, which are closest to the center of the touch unit, of the two sensing electrodes are connected together so as to form an annular region in the center of the touch unit, the first electrode is located in the annular region; one end of each of the third connecting bridges is electrically coupled with the first electrode, and the other end of each of the third connecting bridges is electrically coupled with one of the first limb portions of the two driving electrodes which are not connected together or one of the second limb portions of the two sensing electrodes which are not connected together; the first limb portions and the second limb portions which are alternately engaged with each other are spaced apart and insulated from each other.

In some implementations, orthographic projections of the driving electrodes and the sensing electrodes on the base are sequentially and alternately arranged around the first electrode; the first limb portions are distributed at an edge of the first main body portion proximal to the first electrode; the second limb portions are distributed at an edge of the second main body portion proximal to the first electrode; and in each touch unit, the two driving electrodes are symmetric about the first electrode, and the two sensing electrodes are symmetric about the first electrode.

In some implementations, the first limb portions and the second limb portions are both finger-shaped and have arcuate edges.

In some implementations, the touch unit further includes a plurality of first connecting bridges, the first connecting bridges are distributed proximal to the bridge portion, and each of the first connecting bridges is electrically coupled to the first limb portions, which are close to each other, of the two driving electrodes in the same touch unit.

In some implementations, the touch unit further includes a plurality of second connecting bridges, the second connecting bridges are distributed proximal to the bridge portion, and each of second connecting bridges is electrically coupled to the second limb portions, which are close to each other, of the two sensing electrodes in the same touch unit.

In some implementations, the touch unit further includes a plurality of first connecting bridges and a plurality of second connecting bridges, the first connecting bridges and the second connecting bridges are distributed proximal to the bridge portion, each of the first connecting bridges is electrically coupled to the first limb portions, which are close to each other, of the two driving electrodes in the same touch unit, and each of the second connecting bridges is electrically coupled to the in the same touch unit.

In some implementations, end surfaces, which are opposite to each other, of the first limb portions to which the first connecting bridge is coupled are planar.

In some implementations, end surfaces, which are opposite to each other, of the second limb portions to which the second connecting bridge is coupled are planar.

In some implementations, end surfaces, which are opposite to each other, of the first limb portions to which the first connecting bridge is coupled are planar, and end surfaces, which are opposite to each other, of the second limb portions to which the second connecting bridge is coupled are planar.

In some implementations, the number of the first connecting bridges ranges from 2 to 4, and the number of the second connecting bridges ranges from 2 to 4.

In some implementations, the number of the third connecting bridges ranges from 2 to 4.

In some implementations, the driving electrodes and the sensing electrodes are provided in a same layer, the bridge portion, the first connecting bridges, and the second connecting bridges are provided in a different layer from the driving electrodes and the sensing electrodes, and an insulating layer is further provided between the bridge portion, the first connecting bridges and the second connecting bridges, and the driving electrodes and the sensing electrodes.

In some implementations, along an arrangement direction of the first limb portions, the first limb portions at two ends have relative small lengths, and the first limb portions at a middle portion have relative large lengths, and along an arrangement direction of the second limb portions, the second limb portions at two ends have relative small lengths, and the second limb portions at a middle portion have relative large lengths.

In some implementations, a maximum length of the first limb portions and the second limb portions is about ¼ of a width of the touch unit.

In some implementations, the touch substrate further includes: a protection layer provided on a side, away from the base, of the driving electrodes, the sensing electrodes, the bridging portion, the first connecting bridges and the second connecting bridges.

In some implementations, the touch units are arranged in an array, and where, the driving electrodes of the touch units in a same row are electrically coupled with a first signal line; the sensing electrodes of the touch units in a same column are electrically coupled with a second signal line.

An embodiment of the present disclosure further provides a display panel, including: a display screen; and the touch substrate described above, where the touch substrate is provided on a display side of the display screen.

DETAILED DESCRIPTION

In order to make those skilled in the art better understand the technical solutions of the present disclosure, the touch substrate and the display panel provided by the present disclosure are described in further detail below with reference to the accompanying drawings and specific implementations.

At present, a mutual capacitance touch structure generally includes a touch unit array formed by a plurality of columns of driving electrodes and a plurality of rows of sensing electrodes, and touch units are electrically coupled by adopting a single-channel structure. Adjacent touch units in a same row or a same column are electrically coupled through a connecting bridge.

In the field of handheld display devices, such as mobile phones and tablets, a touch display structure is becoming thinner and thinner on a whole, and with the continuous thinning of the thickness of each film layer of the touch display structure, a distance between the touch sensing pattern layer and the display layer is smaller and smaller, so that touch noise is increased continuously, touch signal amount is decreased continuously, the touch accuracy and the touch sensitivity are deteriorated continuously, and thus a new touch sensing pattern design is required to improve the touch signal amount, the touch accuracy and the touch sensitivity.

Figure 1:
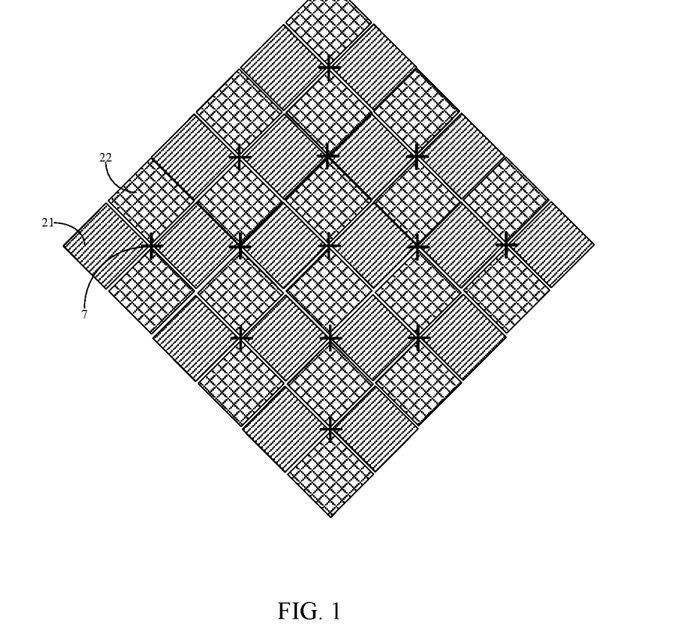
FIG. 1 is a schematic top view of a mutual capacitance touch structure in the related art.

In the related art, as shown in FIG. 1, a mutual capacitance touch structure generally includes a touch unit array composed of a plurality of rows of driving electrodes 21 and a plurality of columns of sensing electrodes 22, and the touch units are electrically coupled by a single-channel structure. Every adjacent touch units in the same row or the same column are electrically coupled through a connecting bridge 7. However, the mutual capacitance touch structure has low touch signal amount during touching, and the touch control precision and the touch control sensitivity are also low.

Figure 2:
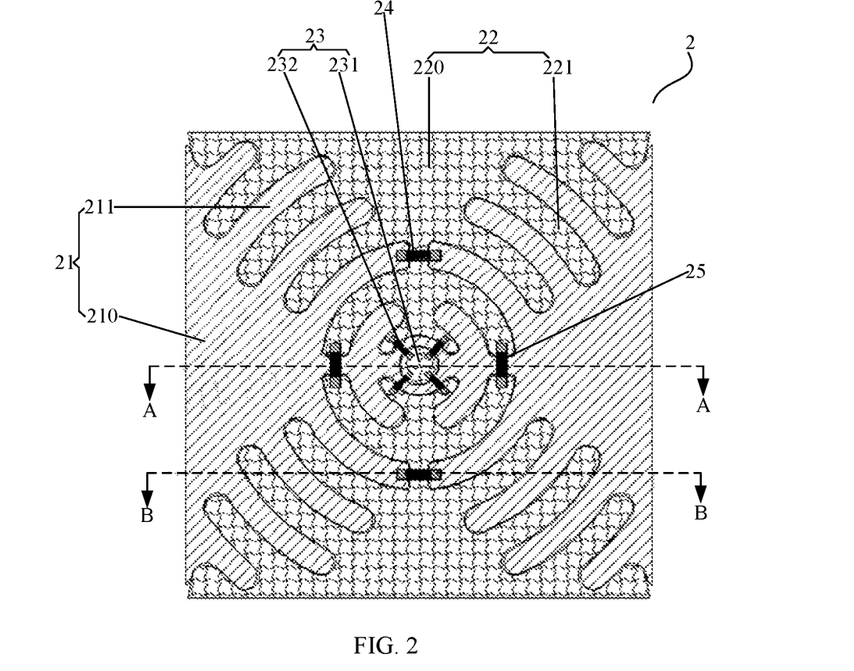
FIG. 2 is a schematic top view of a structure of a touch unit in a touch substrate according to an embodiment of the present disclosure.
Figure 3:
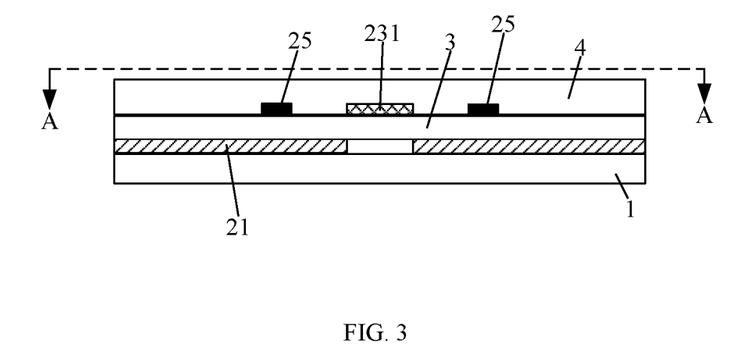
FIG. 3 is a cross-sectional view of the touch unit shown in FIG. 2 taken along a cross-sectional line AA.

In view of the above problems of mutual capacitance touch, an embodiment of the present disclosure provides a touch substrate, as shown in FIG. 2 and FIG. 3, including a base 1 and a plurality of touch units 2 provided on the base 1, where each touch unit 2 includes a driving electrode 21 and a sensing electrode 22, the driving electrode 21 includes a first main body portion 210 and a plurality of first limb portions 211, the first limb portions 211 are located at an edge of the first main body portion 210, and the first limb portions 211 are connected to the first main body portion 210; the sensing electrode 22 includes a second main body portion 220 and a plurality of second limb portions 221, where the second limb portions 221 are located at an edge of the second main body portion 220, and the second limb portions 221 are connected with the second main body portion 220; orthographic projections of the first limb portions 211 and the second limb portions 221 on the base 1 are engaged with each other alternately.

The first main body portion 210 refers to a part of the driving electrode 21 having a relatively large area ratio, and the edge of the first main body portion 210 refers to an edge of an orthographic projection of the part of the driving electrode 21 having the relatively large area ratio on the base 1. The second main body portion 220 refers to a part of the sensing electrode 22 having a relatively large area ratio, and the edge of the second main body portion 220 refers to an edge of an orthographic projection of the sensing electrode 22 having the relatively large area ratio on the base 1. The driving electrode 21 and the sensing electrode 22 are made of indium tin oxide or other transparent conductive materials.

By providing the driving electrode 21 with the plurality of first limb portions 211, the sensing electrode 22 with the plurality of second limb portions 221, and the orthographic projections of the first limb portions 211 and the second limb portions 221 on the base 1 being engaged with each other alternately, compared with the driving electrode and the sensing electrode which are not provided with limb portions in the related art, interaction area between the driving electrode 21 and the sensing electrode 22 in the touch unit 2 can be increased, so that in actual touch, variation of the capacitance sensing signal between the driving electrode 21 and the sensing electrode 22 can be increased, thus the touch signal amount between the driving electrode 21 and the sensing electrode 22 in the touch unit 2 is increased, and the touch accuracy and the touch sensitivity of the touch substrate are improved.

In some implementations, the touch unit 2 further includes a bridge portion 23; the touch unit 2 includes two driving electrodes 21 and two sensing electrodes 22; the bridge portion 23 electrically couples the two sensing electrodes 22 with each other; the first limb portions 211 and the second limb portions 221 which are alternately engaged are spaced apart and insulated from each other.

In some implementations, the orthographic projections of the driving electrodes 21 and the sensing electrodes 22 on the base 1 are alternately arranged around the bridge portion 23 in sequence; the first limb portions 211 are distributed at an edge of the first main body portion 210 proximal to the bridge portion 23; the second limb portions 221 are distributed at an edge of the second main body portion 220 proximal to the bridge portion 23; in the touch unit 2, the two driving electrodes 21 are symmetric about the bridge portion 23, and the two sensing electrodes 22 are symmetric about the bridge portion 23. The driving electrodes 21 and the sensing electrodes 22 are both centrosymmetric patterns, so that the touch performance of the touch substrate is more uniform.

In the present embodiment, the above-mentioned structural arrangement of the driving electrodes 21 and the sensing electrodes 22 can increase the interaction area between the driving electrodes 21 and the sensing electrodes 22 in the touch unit 2, so as to increase the variation of the capacitive sensing signal between the driving electrodes 21 and the sensing electrodes 22, thereby increasing the touch signal amount between the driving electrodes 21 and the sensing electrodes 22 in the touch unit 2, and improving touch accuracy and touch sensitivity of the touch substrate.

In some implementations, the first limb portions 211 and the second limb portions 221 are finger-shaped, and the edges of the driving electrodes 21 and the sensing electrodes 22 are all arcuate. That is, corners at the edges of the driving electrodes 21 and the sensing electrodes 22 are all set to be arcuate chamfers, and an end of each first limb portion 211 away from the first main body portion 210 and an end of each second limb portion 221 away from the second main body portion 220 are also arcuate. Therefore, charge accumulation at the corners of the edges of the driving electrodes 21 and the sensing electrodes 22 can be reduced, the charging time of the driving electrodes 21 can be shortened, the touch speed is increased, and the uniformity of the touch performance is improved to a certain extent. The finger-shaped first limb portions 211 and the finger-shaped second limb portions 221 are arranged, so that the interaction area between the driving electrodes 21 and the sensing electrodes 22 in the touch unit 2 can be increased, and the variation of the capacitance sensing signal between the driving electrodes 21 and the sensing electrodes 22 is increased, thereby increasing the touch signal amount between the driving electrodes 21 and the sensing electrodes 22 in the touch unit 2, and improving the touch accuracy and the touch sensitivity of the touch substrate.

In some implementations, the finger-shaped first limb portions 211 and the finger-shaped second limb portions 221 are also arcuate as a whole, as shown in FIG. 2, such an arrangement can further increase the interaction area between the driving electrodes and the sensing electrodes, so as to increase the variation of the capacitance sensing signal between the driving electrodes 21 and the sensing electrodes 22, thereby increasing the touch signal amount between the driving electrodes 21 and the sensing electrodes 22 in the touch unit 2, and improving the touch accuracy and the touch sensitivity of the touch substrate. In this embodiment, respective radians of the finger-shaped first limb portions 211 and the finger-shaped second limb portions 221 are not limited.

In some implementations, a length of each of the finger-shaped first limb portions 211 and the finger-shaped second limb portions 221 is not limited and may be set as desired. For example, as shown in FIG. 2, according to the layout design of the touch unit, the lengths of the first limb portions 211 and the second limb portions 221 may be designed such that, along an arrangement direction of the first limb portions 211 and the second limb portions 221, the lengths of the first limb portions 211 and the second limb portions 221 located at both ends are relative small and the lengths of the first limb portions 211 and the second limb portions 221 located at the middle are relative large.

In some implementations, the touch unit 2 further includes a plurality of first connecting bridges 24 and a plurality of second connecting bridges 25, the first connecting bridges 24 and the second connecting bridges 25 are both distributed near the bridge portion 23, each of the first connecting bridges 24 electrically couples the first limb portions 211 close to each other of the two driving electrodes 21 in the same touch unit 2, and each of the second connecting bridges 25 electrically couples the second limb portions 221 close to each other of the two sensing electrodes 22 in the same touch unit 2. The first connecting bridges 24 and the second connecting bridges 25 are arranged so as to adjust an impedance of the driving electrodes 21 and the sensing electrodes 22, so as to improve the touch scanning frequency of the touch substrate. The first connecting bridges 24 and the second connecting bridges 25 may be made of a transparent conductive material or a conductive metal material.

It should be noted that opposite end portions of the first limb portions 211 to which the first connecting bridge 24 are electrically coupled or opposite end portions of the second limb portions 221 to which the second connecting bridge 25 are electrically coupled have planar surfaces, which facilitates to increase contact area of the first connecting bridges 24 and the second connecting bridges 25 with the first limb portions 211 or the second limb portions 221, thereby improving the connection stability.

The more the first connecting bridges 24 are provided, the smaller the impedance of the driving electrodes 21 is; the more the second connecting bridges 25 are provided, the smaller the impedance of the sensing electrodes 22 is; however, the more the first connecting bridges 24 and the second connecting bridges 25 are provided, the worse the shadow elimination effect of the touch substrate will be, therefore, by distributing the first connecting bridges 24 and the second connecting bridges 25 close to the bridge portion 23 of the touch unit 2, on one hand, the impedance of the driving electrodes 21 and the impedance of the sensing electrodes 22 can be reduced and the touch scanning frequency of the touch substrate can be increased, and on the other hand, the shadow elimination effect of the touch substrate can be improved.

In some implementations, the number of first connecting bridges 24 ranges from 2 to 4 and the number of second connecting bridges 25 ranges from 2 to 4. In the present embodiment, the number of the first connecting bridges 24 is 2, and the number of the second connecting bridges 25 is 2. The more the first connecting bridges 24 and the second connecting bridges 25 are arranged, the smaller the impedance of each of the driving electrodes 21 and the sensing electrodes 22 is, but the more the first connecting bridges 24 and the second connecting bridges 25 are provided, the worse the shadow elimination effect of the touch substrate will be, and the number range of the first connecting bridges 24 and the second connecting bridges 25 in the embodiment of the present disclosure can not only well reduce the impedance of the driving electrodes 21 and the sensing electrodes 22, thereby improving the touch scanning frequency of the touch substrate, but also improve the shadow elimination effect of the touch substrate.

In the present embodiment, the bridge portion 23 includes a first electrode 231 and third connecting bridges 232, and the first electrode 231 and the third connecting bridges 232 are electrically coupled together; the number of the third connecting bridges 232 ranges from 2 to 4. The first electrode 231 in the bridge portion 23 is provided to further increase the interaction area between the driving electrodes 21 and the sensing electrodes 22 in the touch unit 2, so as to increase the variation of the capacitance sensing signal between the driving electrodes 21 and the sensing electrodes 22, thereby further increasing the touch signal amount between the driving electrodes 21 and the sensing electrodes 22 in the touch unit 2. In the present embodiment, the two driving electrodes 21 in the touch unit 2 are electrically coupled, that is, the two driving electrodes 21 are integrally formed into one piece, in other words, the closest first limb portions of the two driving electrodes 21 that are oppositely arranged are electrically coupled to each other, as shown in FIG. 2, so that a hollow region is formed between the first limb portions that are electrically coupled to each other, and the first electrode 231 is arranged in the hollow region; since the two sensing electrodes 22 are not electrically coupled together, that is, the two sensing electrodes 22 are not integrally formed into one piece but are separated from each other, the third connecting bridges 232 mainly serve to electrically couple the two sensing electrodes 22 in the touch unit 2, as shown in FIG. 2, one end of each of the third connecting bridges 232 is electrically coupled to the first electrode 231, and the other end of each of the third connecting bridges 232 is electrically connected to the second limb portion of the sensing electrode 22 adjacent thereto, so that the two sensing electrodes separated from each other are electrically coupled together through the first electrode 231 and the third connecting bridges 232. In such case, the first electrode 231 and the third connecting bridges 232 are insulated from the two driving electrodes. Meanwhile, the set range of the number of the third connecting bridges 232 in the embodiment of the present disclosure can not only reduce the impedance of the sensing electrodes 22, thereby improving the touch scanning frequency of the touch substrate, but also improve the shadow elimination effect of the touch substrate. Certainly, in some implementations, in the touch unit 2, the two sensing electrodes 22 may be electrically coupled, i.e., integrally formed into one piece, in other words, the nearest second limb portions of the two sensing electrodes 22 provided opposite to each other are electrically coupled to each other, so that an annular hollow region is formed between the second limb portions coupled to each other, and the first electrode 231 is provided in the hollow region; while the two driving electrodes 21 are not electrically coupled with each other, i.e., the two driving electrodes 21 are not integrally formed into one piece but are separated from each other, and the bridge portion 23 electrically couples the two driving electrodes 21; one end of each of the third connecting bridges 232 is electrically coupled to the first electrode, and the other end of each of the third connecting bridges 232 is electrically coupled to the first limb portion of the driving electrode 21 adjacent thereto, so that the two driving electrodes separated from each other are electrically coupled with each other through the first electrode 231 and the third connecting bridges 232. In such case, the first electrode 231 and the third connecting bridges 232 are insulated from the two sensing electrodes.

Figure 4:
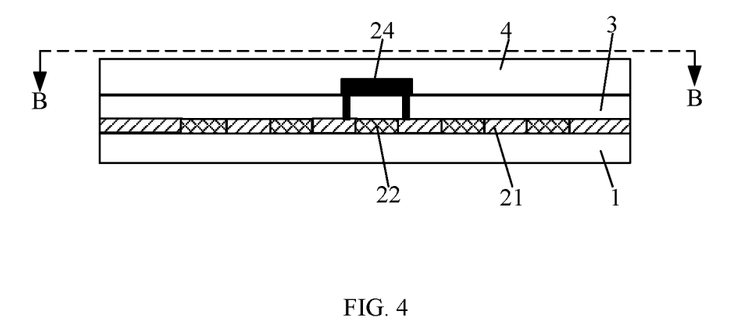
FIG. 4 is a schematic cross-sectional view of the touch unit shown in FIG. 2 taken along a cross-sectional line BB.

In some implementations, as shown in FIGS. 3 and 4, the driving electrodes 21 and the sensing electrodes 22 are provided in a same layer, the bridge portion 23, the first connecting bridges 24 and the second connecting bridges 25 are provided in a different layer from the driving electrodes 21 and the sensing electrodes 22, and an insulating layer 3 is further provided between the bridge portion 23, the first connecting bridges 24, the second connecting bridges 25 and the driving electrodes 21, the sensing electrodes 22. The bridge portion 23 is electrically coupled to the two sensing electrodes 22 through via holes provided in the insulating layer 3; the first connecting bridges 24 is electrically coupled to the two first limb portions 211 which are close to each other through via holes provided in the insulating layer 3; the second connecting bridges 25 is electrically coupled to the two second limb portions 221 which are close to each other through via holes provided in the insulating layer 3. The insulating layer 3 is made of silicon oxide material or silicon nitride material.

In some implementations, the driving electrodes 21, the sensing electrodes 22 and the first electrode 231 are provided in a same layer, the first connecting bridges 24, the second connecting bridges 25 and the third connecting bridges 232 are provided in a different layer from the driving electrodes 21 and the sensing electrodes 22, and an insulating layer 3 is further provided between the first connecting bridges 24, the second connecting bridges 25, the third connecting bridges 232 and the driving electrodes 21, the sensing electrodes 22.

It should be noted that the following arrangements may also be adopted: the driving electrodes and the sensing electrodes are located in different layers, the first connecting bridges 24 coupling the first limb portions 211 are arranged in a same layer as the driving electrodes 21, and the second connecting bridges 25 coupling the second limb portions 221 and the bridge portion 23 are arranged in a same layer as the sensing electrodes 22; and an insulating layer 3 is further provided between the driving electrodes 21 and the sensing electrodes 22.

In the present embodiment, the touch substrate further includes a protection layer 4, and the protection layer 4 is provided on a side of the driving electrodes 21, the sensing electrodes 22, the bridge portion 23, the first connecting bridges 24, and the second connecting bridges 25 away from the base 1. The protection layer 4 can protect the driving electrodes 21, the sensing electrodes 22, the bridge portion 23, the first connecting bridges 24, and the second connecting bridges 25. The protection layer 4 is made of silicon oxide material or silicon nitride material, and the protection layer 4 may also be made of organic insulating resin material.

Figure 5:
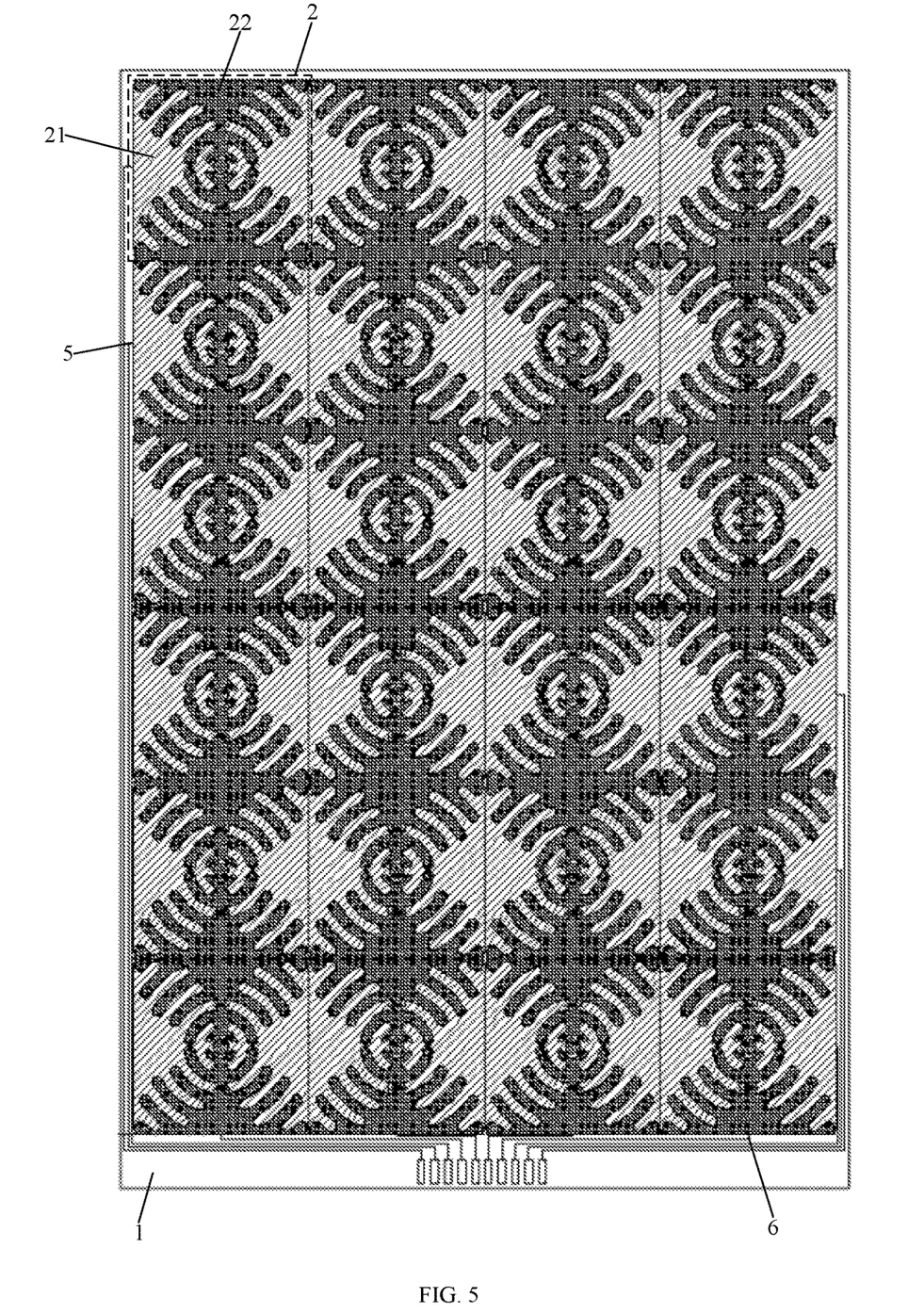
FIG. 5 is a top view of a structure of a touch substrate including the touch unit of FIG. 2.

In the present embodiment, as shown in FIG. 5, the touch substrate includes a plurality of touch units 2, and the touch units 2 are arranged in an array; the driving electrodes 21 in the touch units 2 of a same row are coupled with a first signal line 5; the sensing electrodes 22 in the touch units 2 of a same column are coupled with a second signal line 6. The driving electrodes 21 in the touch units 2 of a same row are coupled together, and the sensing electrodes 22 in the touch units 2 of a same column are coupled together.

Based on the above structure of the touch substrate, the present embodiment further provides a driving method of the touch substrate, including: applying a driving voltage signal to the driving electrode of the touch unit; and receiving a voltage signal output by the sensing electrode of the touch unit.

In the present embodiment, the driving method further includes: driving the touch units row by row.

The principle that the touch substrate realizes mutual capacitance touch is as follows: when a finger touches the touch substrate, the coupling between the driving electrode and the sensing electrode near a touch point is influenced, so that the capacitance between the driving electrode and the induction electrode is changed; when the mutual capacitance is detected, driving voltage signals are sequentially input to the driving electrodes arranged in a row direction, the sensing electrodes arranged in a column direction receive signals at the same time, the capacitance values of all intersection points of row directions and column directions can be obtained, namely the capacitances in the two-dimensional plane of the whole touch substrate are obtained, and the coordinate of the touch point can be calculated according to capacitance variation data in the two-dimensional plane of the touch substrate, so that mutual capacitance touch of the touch substrate is realized.

Figure 6:
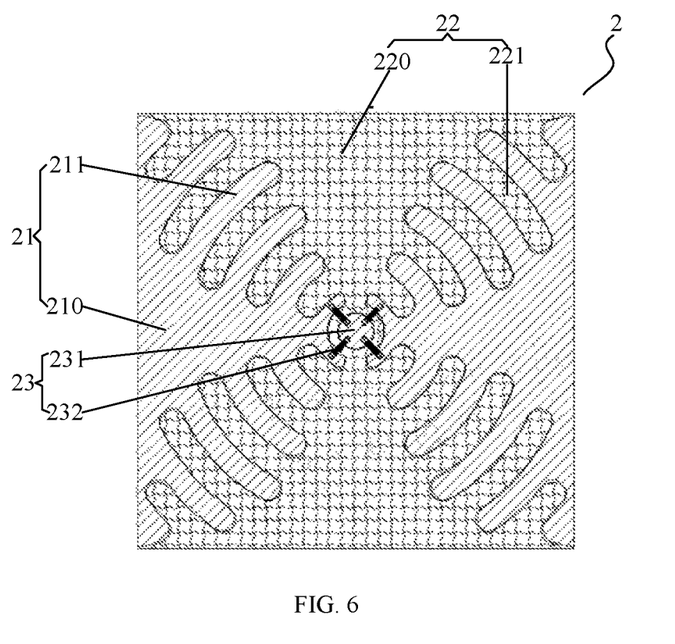
FIG. 6 is a schematic top view of a structure of a touch unit in a touch substrate according to another embodiment of the present disclosure.

An embodiment of the present disclosure provides a touch substrate, which is different from the above-mentioned embodiment in that, as shown in FIG. 6, in the touch unit 2, two sensing electrodes 22 are electrically coupled together, i.e., integrally formed into one piece, in other words, the nearest second limb portions of the two sensing electrodes 22 provided opposite to each other are electrically coupled to each other, as shown in FIG. 6, so that an annular hollow region is formed between the second limb portions coupled to each other, and the first electrode 231 is provided in the hollow region; while the two driving electrodes 21 are not electrically coupled together, i.e., the two driving electrodes 21 are not integrally formed into one piece but are separated from each other, and the bridge portion 23 electrically couples the two driving electrodes 21; as shown in FIG. 6, one end of each of the third connecting bridges 232 is electrically coupled to the first electrode 231, and the other end of each of the third connecting bridges 232 is electrically coupled to the first limb portion of the driving electrode 22 adjacent thereto, respectively, so that the two driving electrodes separated from each other are electrically coupled through the first electrode 231 and the third connecting bridges 232. In such case, the first electrode 231 and the third connecting bridges 232 are insulated from the two sensing electrodes. In the present embodiment, no first connecting bridges and the second connecting bridge are provided in the touch unit 2.

The structure of the bridge portion 23 is the same as that in the above embodiment, that is, the bridge portion 23 includes a first electrode 231 and a plurality of third connecting bridges 232, the driving electrodes 21 and the sensing electrodes 22 are provided in a same layer, the bridge portion 23 is located in a different layer from the driving electrodes 21 and the sensing electrodes 22, an insulating layer is further provided between the bridge portion 23 and the driving electrodes 21 and the sensing electrodes 22, and the bridge portion 23 is coupled to the two driving electrodes 21 through via holes formed in the insulating layer.

The third connecting bridges 232 in the bridge portion 23 not only can electrically couple the two driving electrodes 21 in the touch unit 2, but also can well reduce the impedance of the driving electrodes 21, thereby improving the touch scanning frequency of the touch substrate and improving the shadow elimination effect of the touch substrate.

Other structures and driving methods of the touch substrate in the present embodiment are the same as those in the above embodiment, and are not described herein again.

Figure 7:
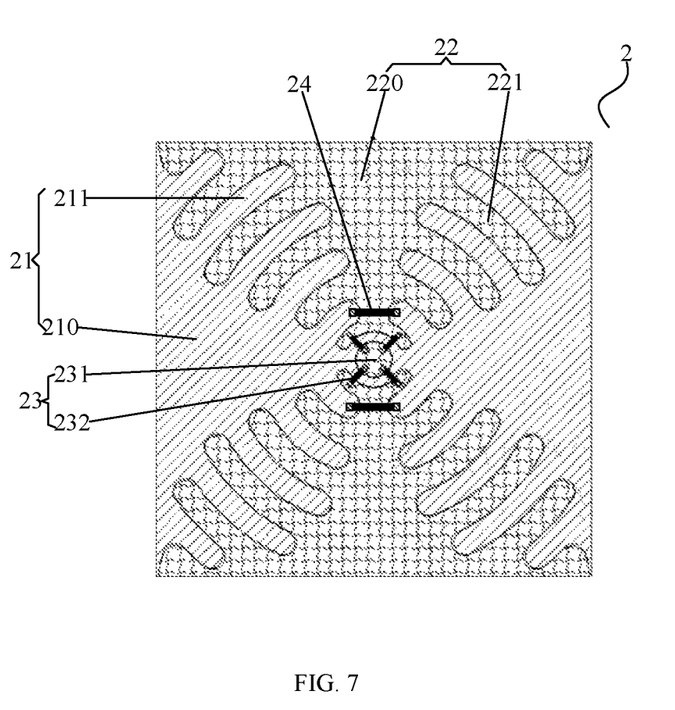
FIG. 7 is a schematic top view of a structure of a touch unit in a touch substrate according to further another embodiment of the present disclosure.

An embodiment of the present disclosure further provides a touch substrate, which is different from the above embodiments in that, as shown in FIG. 7, the touch unit 2 is provided with only a plurality of first connecting bridges 24, the first connecting bridges 24 are distributed near the bridge portion 23, and each of the first connecting bridges 24 is electrically coupled to first limb portions 211, which are close to each other, of the two driving electrodes 21 in the same touch unit 2. In the present embodiment, no second connecting bridge is provided.

The first connecting bridges 24 are provided to reduce the impedance of the driving electrodes 21, thereby improving the touch scanning frequency of the touch substrate.

Other structures and driving methods of the touch substrate in the present embodiment are the same as those in any of the above embodiments, and are not repeated herein.

Figure 8:
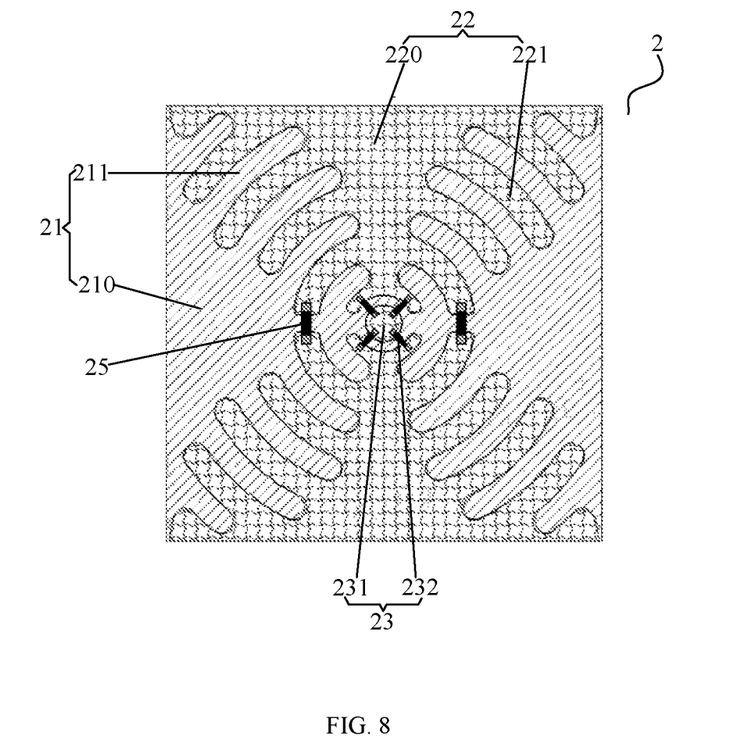
FIG. 8 is a schematic top view of a structure of a touch unit in a touch substrate according to still another embodiment of the present disclosure.

An embodiment of the present disclosure further provides a touch substrate, which is different from the above embodiments in that, as shown in FIG. 8, the touch unit 2 is only provided with a plurality of second connecting bridges 25, the second connecting bridges 25 are distributed near the bridge portion 23, and each of the second connecting bridges 25 is electrically coupled to the second limb portions 221, which are close to each other, of the two sensing electrodes 22 in the same touch unit 2. In the present embodiment, no first connecting bridge is provided.

The second connecting bridges 25 are provided to reduce the impedance of the sensing electrodes 22, thereby improving the touch scanning frequency of the touch substrate.

Other structures and driving methods of the touch substrate in the present embodiment are the same as those in any of the above embodiments, and are not repeated herein.

According to the touch substrates provided by the embodiments of the present disclosure, each of the driving electrodes is provided with the first limb portions, each of the sensing electrodes is provided with the second limb portions, and the orthographic projections of the first limb portions and the second limb portions on the base are alternately engaged with each other, compared with the driving electrodes and the sensing electrodes which are not provided with limb portions in the related art, interaction area between the driving electrodes and the sensing electrodes in the touch unit can be increased, so that in actual touch, variation of the capacitance sensing signal between the driving electrodes and the sensing electrodes can be increased, thus the touch signal amount between the driving electrodes and the sensing electrodes in the touch unit is increased, and the touch accuracy and the touch sensitivity of the touch substrate are improved.

An embodiment of the present disclosure further provides a display panel, which includes a display screen and the touch substrate in any of the above embodiments, where the touch substrate is provided on a display side of the display screen.

The present embodiment further provides a driving method of the display panel, including: simultaneously driving the display screen to display and driving the touch substrate to detect touch; or driving the display screen to display and driving the touch substrate to detect touch in a time-sharing mode.

By adopting the touch substrate in any of the above embodiments, the touch signal amount of the display panel during touch is increased, so that the touch accuracy and the touch sensitivity of the display panel are improved.

Figure 9:
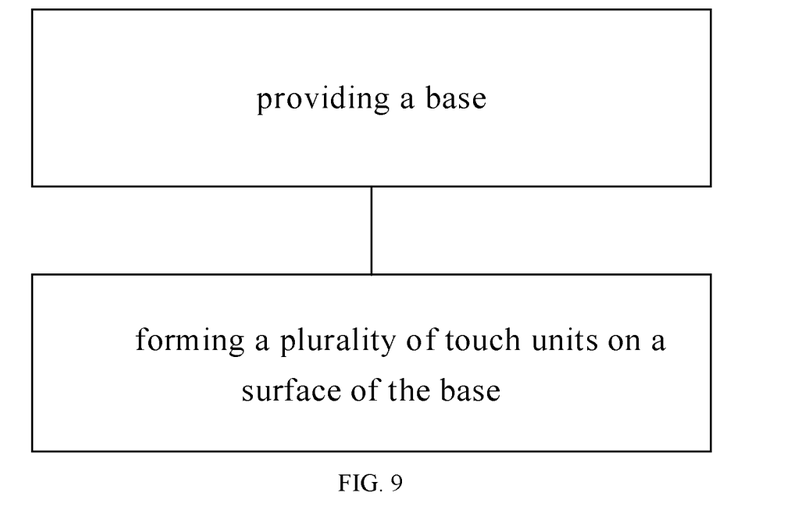
FIG. 9 is a flowchart of a method for manufacturing a touch substrate according to an embodiment of the present disclosure.

An embodiment of the present disclosure further provides a method for manufacturing a touch substrate, as shown in FIG. 9, including:

providing a base; and forming a plurality of touch units on a surface of the base, where each touch unit is formed to include a driving electrode and a sensing electrode, the driving electrode includes a first main body portion and a plurality of first limb portions, the first limb portions are positioned on an edge of the first main body portion, and the first limb portions are connected with the first main body portion; the sensing electrode includes a second main body portion and a plurality of second limb portions, the second limb portions are positioned on an edge of the second main body portion, and the second limb portions are connected with the second main body portion; and where orthographic projections of the first limb portions on the base and orthographic projections of the second limb portions on the base are alternately engaged with each other, and at least parts of profiles of opposite edges of the first limb portions and the second limb portions, which are engaged with each other, are arcuate and substantially consistent with each other.

In some implementations, the touch unit is formed to include two driving electrodes and two sensing electrodes, and the step of forming the plurality of touch units further includes:

forming a bridge portion in each touch unit, where the bridge portion includes a first electrode and third connecting bridges, the first limb portions of the two driving electrodes closest to a center of the touch unit or the second limb portions of the two sensing electrodes closest to the center of the touch unit are coupled together to form an arcuate region in the center of the touch unit, the first electrode is located in the annular region;

one end of each third connecting bridge is electrically coupled with the first electrode, and the other end of each third connecting bridge is electrically coupled with one of the first limb portions of the two driving electrodes which are not connected together or one of the second limb portions of the two sensing electrodes which are not connected together; and the first limb portions and the second limb portions which are alternately engaged with each other are formed to be spaced apart and insulated from each other.

In some implementations, the step of forming the plurality of touch units further includes:

forming the driving electrodes and the sensing electrodes so that orthographic projections the driving electrodes and the sensing electrodes on the base are alternately arranged in sequence around the first electrode, the first limb portions are distributed at an edge of the first main body portion close to the first electrode; the second limb portions are distributed at an edge of the second main body portion close to the first electrode; and in each touch unit, the two driving electrodes are symmetric about the first electrode, and the two sensing electrodes are symmetric about the first electrode.

In some implementations, the step of forming the plurality of touch units further includes:

forming each of the first limb portions and the second limb portions as a finger-shaped and forming an edge of each of the first limb portions and the second limb portions as an arcuate.

In some implementations, the step of forming the plurality of touch units further includes:

forming a plurality of first connecting bridges and/or a plurality of second connecting bridges in each touch unit, where the first connecting bridges and the second connecting bridges are all distributed close to the bridge portion, each first connecting bridge couples the first limb portions, which are close to each other, of the two driving electrodes in the same touch unit, and each second connecting bridge couples the second limb portions, which are close to each other, of the two sensing electrodes in the same touch unit.

In some implementations, the step of forming the bridge portion further includes:

forming a first electrode and third connecting bridges, and electrically coupling the first electrode with the third connecting bridges.

In some implementations, the driving electrodes and the sensing electrodes are provided in a same layer, and the bridge portion, the first connecting bridges and the second connecting bridges are provided in a different layer from the driving electrodes and the sensing electrodes, and the step of forming the plurality of touch units further includes:

forming an insulating layer between the bridge portion, the first connecting bridges, the second connecting bridges and the driving electrodes, the sensing electrodes.

In some implementations, the number of the first connecting bridges is 2 to 4, and the number of the second connecting bridges is 2 to 4.

In some implementations, the number of the third connecting bridges is 2 to 4.

In some implementations, the step of forming the first limb portions further includes: forming end surfaces, which are opposite to each other, of the first limb portions to which the first connecting bridge is coupled as a plane.

In some implementations, the step of forming the second limb portions further includes: forming end surfaces, which are opposed to each other, of the second limb portions to which the second connecting bridge is connected as a plane.

In some implementations, the step of forming the first limb portions and the second limb portions further includes: forming the first limb portions at both ends to be small in length and the first limb portions at the middle portion to be large in length along an arrangement direction of the first limb portions, and forming the second limb portions at both ends to be small in length and the second limb portions at the middle portion to be large in length along the arrangement direction of the second limb portions.

In some implementations, the step of forming the first limb portions and the second limb portions further includes: forming the first limb portions and second limb portions so that a maximum length of the first limb portions and the second limb portions is about ¼ of a width of the touch unit. For example, each touch unit is a square with a side length of d, and the maximum length of the first limb portions and the second limb portions may be about d/4.

In some implementations, the method for manufacturing the touch substrate further includes:

forming a protection layer on a side of the driving electrodes, the sensing electrodes, the bridging portion, the first connecting bridges and the second connecting bridges away from the base.

In some implementations, the touch units are arranged in an array, and the method further includes:

coupling the driving electrodes of the touch units in a same row with a first signal line; and coupling the sensing electrodes of the touch units in a same column with a second signal line.

In the touch substrate manufactured by the method provided by the embodiment of the present disclosure, each of the driving electrodes is provided with the first limb portions, each of the sensing electrodes is provided with the second limb portions, and the orthographic projections of the first limb portions and the second limb portions on the base are alternately engaged with each other, compared with the driving electrodes and the sensing electrodes which are not provided with limb portions in the related art, interaction area between the driving electrodes and the sensing electrodes in the touch unit can be increased, so that in actual touch, variation of the capacitance sensing signal between the driving electrodes and the sensing electrodes can be increased, thus the touch signal amount between the driving electrodes and the sensing electrodes in the touch unit is increased, and the touch accuracy and the touch sensitivity of the touch substrate are improved.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the present disclosure, and these changes and modifications are to be considered within the scope of the present disclosure.

The invention claimed is:

1. A touch substrate, comprising:
a base; and
a plurality of touch units provided on the base, wherein each touch unit comprises a driving electrode and a sensing electrode, and the driving electrode comprises a first main body portion and a plurality of first limb portions, the first limb portions are positioned on an edge of the first main body portion, and the first limb portions are connected to the first main body portion; the sensing electrode includes a second main body portion and a plurality of second limb portions, the second limb portions are positioned on an edge of the second main body portion, and the second limb portions are connected with the second main body portion; and wherein
orthographic projections of the first limb portions on the base and orthographic projections of the second limb portions on the base are alternately engaged with each other, and at least parts of profiles of opposite edges of the first limb portions and the second limb portions, which are engaged with each other, are arcuate and substantially consistent with each other,
wherein the touch unit comprises two driving electrodes and two sensing electrodes,
the touch unit further comprises a bridge portion, the bridge portion comprises a first electrode and third connecting bridges, the first limb portions, which are closest to a center of the touch unit, of the two driving electrodes or the second limb portions, which are closest to the center of the touch unit, of the two sensing electrodes are connected together so as to form an annular region in the center of the touch unit,
the first electrode is located in the annular region;
one end of each of the third connecting bridges is electrically coupled with the first electrode, and the other end of each of the third connecting bridges is electrically coupled with one of the first limb portions of the two driving electrodes which are not connected together or one of the second limb portions of the two sensing electrodes which are not connected together;
the first limb portions and the second limb portions being alternately engaged with each other are spaced apart and insulated from each other, and wherein
orthographic projections of the driving electrodes and the sensing electrodes on the base are sequentially and alternately arranged around the first electrode; the first limb portions are distributed at an edge of the first main body portion close to the first electrode; the second limb portions are distributed at an edge of the second main body portion close to the first electrode; and wherein
in each touch unit, the two driving electrodes are symmetric about the first electrode, and the two sensing electrodes are symmetric about the first electrode.

2. The touch substrate of claim 1, wherein the first limb portions and the second limb portions are both finger-shaped and have arcuate edges.

3. The touch substrate of claim 1, wherein the touch unit further comprises a plurality of first connecting bridges, the first connecting bridges are distributed close to the bridge portion, and each of the first connecting bridges is electrically coupled to the first limb portions, which are close to each other, of the two driving electrodes in the same touch unit.

4. The touch substrate of claim 1, wherein the touch unit further comprises a plurality of second connecting bridges, the second connecting bridges are distributed close to the bridge portion, and each of second connecting bridges is electrically coupled to the second limb portions, which are close to each other, of the two sensing electrodes in the same touch unit.

5. The touch substrate of claim 1, wherein the touch unit further comprises a plurality of first connecting bridges and a plurality of second connecting bridges, the first connecting bridges and the second connecting bridges are distributed close to the bridge portion, each of the first connecting bridges is electrically coupled to the first limb portions, which are close to each other, of the two driving electrodes in the same touch unit, and each of the second connecting bridges is electrically coupled to the second limb portions, which are close to each other, of the two sensing electrodes in the same touch unit.

6. The touch substrate of claim 3, wherein end surfaces, which are opposite to each other, of the first limb portions to which the first connecting bridge is coupled are planar.

7. The touch substrate of claim 4, wherein end surfaces, which are opposite to each other, of the second limb portions to which the second connecting bridge is coupled are planar.

8. The touch substrate of claim 5, wherein end surfaces, which are opposite to each other, of the first limb portions to which the first connecting bridge is coupled are planar, and end surfaces, which are opposite to each other, of the second limb portions to which the second connecting bridge is coupled are planar.

9. The touch substrate of claim 3, wherein the number of the first connecting bridges ranges from 2 to 4.

10. The touch substrate of claim 4, wherein the number of the second connecting bridges ranges from 2 to 4.

11. The touch substrate of claim 5, wherein the number of the first connecting bridges ranges from 2 to 4, and the number of the second connecting bridges ranges from 2 to 4.

12. The touch substrate of claim 1, wherein the number of the third connecting bridges ranges from 2 to 4.

13. The touch substrate of claim 11, wherein the driving electrodes and the sensing electrodes are provided in a same layer, the bridge portion, the first connecting bridges, and the second connecting bridges are provided in a different layer from the driving electrodes and the sensing electrodes, and an insulating layer is further provided between the bridge portion, the first connecting bridges, the second connecting bridges and the driving electrodes, the sensing electrodes.

14. The touch substrate of claim 1, wherein along an arrangement direction of the first limb portions, the first limb portions at two ends have relative small lengths, and the first limb portions at a middle portion have relative large lengths, and along an arrangement direction of the second limb portions, the second limb portions at two ends have relative small lengths, and the second limb portions at a middle portion have relative large lengths.

15. The touch substrate of claim 1, wherein a maximum length of the first limb portions and the second limb portions is about ¼ of a width of the touch unit.

16. The touch substrate of claim 13, further comprising: a protection layer provided on a side, away from the base, of the driving electrodes, the sensing electrodes, the bridging portion, the first connecting bridges and the second connecting bridges.

17. The touch substrate of claim 1, wherein the touch units are arranged in an array, and wherein the driving electrodes of the touch units in a same row are electrically coupled with a first signal line; the sensing electrodes of the touch units in a same column are electrically coupled with a second signal line.

18. A display panel, comprising:

a display screen, and the touch substrate of claim 1, wherein the touch substrate is provided on a display side of the display screen.

* * * * *